United States Patent [19]

Shrikhande et al.

[11] Patent Number: 4,898,742
[45] Date of Patent: Feb. 6, 1990

[54] PROCESS FOR THE DECHARACTERIZATION OF BASE WINE

[75] Inventors: Anil J. Shrikhande, Farmington, Conn.; Joseph A. Alioto, Madera, Calif.

[73] Assignee: Heublein, Inc., Farmington, Conn.

[21] Appl. No.: 21,050

[22] Filed: Mar. 2, 1987

[51] Int. Cl.$^4$ ............................................. C12G 3/08
[52] U.S. Cl. ................................... 426/271; 426/592
[58] Field of Search ............ 426/592, 271, 253, 330.4, 426/422, 423, 424; 210/651, 670, 672, 663, 660, 694

[56] References Cited

U.S. PATENT DOCUMENTS

| | | | |
|---|---|---|---|
| 2,271,797 | 2/1942 | Gross | 426/592 |
| 3,437,491 | 4/1969 | Peterson | 426/271 |
| 3,914,442 | 10/1975 | Servadio et al. | 426/592 |
| 3,985,648 | 10/1976 | Casolo | 210/694 |
| 4,156,026 | 5/1979 | Gogel | 426/271 |
| 4,205,092 | 5/1980 | Mattick et al. | 426/592 |
| 4,414,231 | 11/1983 | Ficca | 426/592 |
| 4,514,427 | 4/1985 | Mitchell | 426/271 |

FOREIGN PATENT DOCUMENTS

| | | | |
|---|---|---|---|
| 979829 | 12/1975 | Canada | 426/592 |
| 2644683 | 4/1978 | Fed. Rep. of Germany | 426/592 |
| 144879 | 12/1980 | Japan . | |
| 612957 | 6/1978 | U.S.S.R. | 426/592 |
| 644830 | 1/1979 | U.S.S.R. | 426/592 |
| 709675 | 12/1980 | U.S.S.R. | 426/592 |
| 927851 | 5/1982 | U.S.S.R. | 426/592 |
| 968064 | 10/1982 | U.S.S.R. | 426/592 |
| 2027447 | 2/1980 | United Kingdom | 426/592 |

Primary Examiner—Carolyn Paden
Attorney, Agent, or Firm—McCormick, Paulding & Huber

[57] ABSTRACT

The instant invention relates to a process for preparing a decharacterized neutralized fortified wine base and the product therefrom. The wine base is optionally deacidified and is utilized for preparing natural flavor wine coolers such as chocolate and peach wine coolers.

4 Claims, No Drawings

PROCESS FOR THE DECHARACTERIZATION OF BASE WINE

BACKGROUND OF THE INVENTION

Flavored wine products have been produced for thousands of years. The original flavored wine products, flavored with pine resin or herbs, were produced to cover up off characters in the wines. The development of flavored wine products is limited by the need to find flavors which are compatible with a wine's vinous character and acidity. Previous attempts to incorporate non-compatible flavors into flavored wines frequently needed high levels of flavors and sweetness to mask the wine's basic character. The required high flavor and sugar levels precluded the development of light and refreshing wine beverages with some very popular flavors.

Flavored wine products which have been produced during the past 30 years generally fall within the following three categories: (1) high alcohol content, non-carbonated flavored wines (17-24% alcohol) such as vermouths, (2) carbonated wines (7-12% alcohol) and (3) wine coolers (4-6% alcohol) which are blends of wine, carbonated water, high fructose corn syrup and/or fruit juices and natural flavors.

Wine coolers presently represent the fastest growing segment in the wine beverage field as they appeal to consumer's needs for good tasting, light and refreshing beverages. To date, wine coolers which have been produced and marketed have been limited to citrus or fruit flavored types since these flavors are generally compatible with wine character.

Attempts to produce wine coolers which incorporate other popular flavors such as chocolate or cola have been stymied due to the undesirable conflicting flavors of wine and these potential flavorants.

Wines are utilized less than distilled spirits in the production of cordial type beverages because the wine's vinous character interlines with the flavors added to provide the beverage with its distinctive flavor.

SUMMARY OF THE INVENTION

In accordance with the principles of the instant invention popular flavorants such as chocolate, peach and cola can be blended into a wine cooler base which is prepared from decharacterized and optionally deacidified dry white wine to produce a beverage which possesses a distinctive, undistorted flavor.

It is an object of the instant invention to provide a process for the production of a decharacterized and deacidified wine base.

It is a further object of the instant invention to provide decharacterized and deacidified wine base products which do not possess undesirable conflicting flavors when utilized in conjunction with popular flavorants.

It is a further object of the instant invention to produce popular flavored wine coolers such as a chocolate wine cooler having acceptable palatability.

It is a further object of the instant invention to produce wine-based cordial type beverages, of several flavor types, with acceptable patentability.

DETAILED DESCRIPTION OF THE INVENTION

With the diversification of wine cooler flavor varying from the traditional fruit types to flavors such as chocolate, cola and root beer, it has become necessary to remove uncompatible wine character and natural acid from white wine base in order to impart desirable sensory qualities to the newly formulated wine coolers.

Wine character removal is accomplished in the instant invention by passing the untreated wine base through a column containing an adsorbent material or a non-ionic ion exchange resin. This treatment serves to remove all of the vinous character from the wine and the color of the treated wine resembles a water white appearance. Typically the wine is passed an absorbent bed in a suitable support column in an amount of approximately 15 to 25, preferably 20, bed volumes at a flow rate of approximately 4-5 bed volumes per hour.

Adsorbent and non-ionic ion exchange materials which have been found to be highly effective and extremely suitable for use with the subject wine character removal process are readily available on the commercial market. In this regard and by way of example, effective ion exchange resins, are produced and sold by the Rohm and Haas Company under its identifying trademarks "Duolite S-761", "Amberlite XAD-4" and "Amberlite XAD-16". These resins are classified as non-ionic adsorbents. Of the illustrative resins mentioned "Duolite S-761" has been found to be particularly suitable for use in the subject procedure. For repeated use, the adsorbent can be regenerated with a caustic solution.

After the wine has been subjected to the wine character removal procedure the wine is optionally deacidified. Deacidification of the wine base may not be necessary in the formulation of certain wine coolers such as cola or root beer in which the acid content of the wine does not conflict with the flavorant to be added. Utilizing the instant deacidification process the acidity in the wine base is normally reduced below the levels found in normal wines ideally below 0.02 grams per 100 milliliters of wine base.

Deacidification of the wine base is performed by passing the decharacterized wine base through an anion exchange resin bed. Typically twenty bed volumes of decharacterized wine is passed through a previously conditioned and regenerated bed of anion exchange resin at a flow rate of 4 to 5 bed volumes per hour. This deacidification process deacidifies the wine base having an original acidity of approximately 0.6% to 0.02-0.05%. The acidity of the wine can be controlled by varying the volume of wine base to be treated or blending deacidified wine base with neutral wine base.

Anionic ion exchange materials which have been found to be effective in the deacidification process are readily available in the commercial marketplace. Effect anion exchange resins are sold by the Rohm and Haas Company under its identifying trademarks "Duolite A-7", "Duolite A-368", "Duolite A-392" and "Amberlite IRA-35". These resins are classified as weak base anion exchangers having a high porosity phenolic matrix, styrene divinyl matrix or acrylic divinyl benzene matrix with amine active sites.

For further descriptive information concerning the illustrative ion exchange resins mentioned, reference is directed to: the "Rohm and Haas Ion Exchange Resins" printed in 1985 by Rohm and Haas Company as Technical Bulletin Fluid Process Chemicals. It should be understood of course that the resins specifically identified above are set out for purposes of illustration and that other suitable resins are available including those of other manufacturers.

It is important that only weak anion exchangers of which "Duolite A-7" is typical, are employed in the deacidification process step. These anionic exchange resins are employed in essentially free base form and thus may be regenerated in any known fashion with a suitable basic regenerate of which caustic, ammonium hydroxide and lime are typical. Following regeneration of the ion exchange resins, they are washed in known fashion with pure water to remove any excess regenerate therefrom. Thereafter the regenerated resins may be treated by passing air or nitrogen thereover to remove excess water therefrom. Preferably also, because the resins employed are in the form or porous beads or granules, a conventional "sweetening-on" procedure of known type common in the industry is employed prior to the actual service run for the quantity of wine being treated to remove any entrapped water from inside the pores of the resins. Following the service run, a conventional "sweetening-off" procedure is employed before the respective resins are regenerated for another service run to remove any entrapped wine from the resins.

On a commercial scale, conventional large ion exchange columns of known types may be employed through which the base wine is introduced in sequence to first pass over a bed of non-ionic and then over a bed of anionic resin contained in the respective columns. Temporary intermediate storage of the wine being treated may or may not be employed between the non-ionic and anionic resin columns, depending upon production conditions and requirements. Either up-flow or down-flow for the base wine may be employed but down-flow is preferred so that the wine, which normally is introduced under some pump pressure into the columns, may flow downwardly under the additional effects of gravity over the resins contained in the respective columns. However, this process is not restricted to such a columnar treating procedure and the base wine being treated in manners other than by passing the same through an ion exchange column. For example, a true batch process may be employed in which predetermined amounts of resins may be added to the wine in vats and agitated with the resins therein.

When ion exchange columns are employed, for decharacterization and deacidification, even though the wine flows generally continuously through the respective columns (with or without intermediate storage between columns) the procedure is basically a batch procedure in that a given quantity of wine is passed sequentially through the columns in a two step procedure, followed by the preferred regeneration of the resins before another quantity of wine is contacted with the resins. By way of example, it has been found that a non-ionic resin column approximately three feet in diameter and eight feet high, containing a bed of approximately thirty cubic feet of non-ionic resin, and a similar size anionic column, containing a bed of approximately twenty-four cubic feet of anionic resin, are effective to treat between nine and fifteen thousand gallons of wine before resin regeneration is required. Testing of treated wine passed through the columns for proper acidity determines when regeneration should be effected.

Following the decharacterization procedure step when deacidification is not needed or after the deacidification procedure step when employed, the wine base may be fortified. Fortification of the wine base is accomplished by blending the wine base with high alcohol content spirits such as grape spirits to produce a wine base being containing 18 to 24%, most preferably 23.64% of alcohol by volume. Preferable grape spirits which may be utilized for blending include neutral spirits fruit grape (over 190 proof) and spirits fruit grape (170 to 190 proof).

After the wine base has been fortified it must be further neutralized by a batch treatment with activated powdered carbon. The neutralization process has a dual role of reducing off-odors which are normally associated with grape spirits and removing any trace vinous character which remains in the base wine after decharacterization.

The batch treatment neutralization of the fortified wine base is accomplished by a batch of approximately 1000 gallons of fortified base wine with five to ten pounds of activated powdered carbon such as Norit 211. The wine base and activated powdered carbon mixture is stirred with a mechanical mixer for a period of approximately four to six hours and the neutralized wine base is subsequently recovered by state of the art filtration techniques.

Wine base which is treated by the aforementioned processes exhibits (1) a reduction in the total phenolics of the original wine by approximately 75 to 80% and (2) a reduction in color intensity by approximately 90% thus reducing the browning tendencies of the neutralized wine base.

The treated wine base which is produced by the above-identified processes may be utilized in the production of natural flavored or artificial flavored popular wine cooler type products which contain between 3.0 to 6.5% of alcohol by volume. The treated wine base has been decharacterized, optionally deacidified, optionally fortified and neutralized to eliminate undesirable flavors which would potentially conflict with natural or artificial popular flavorants such as chocolate, root beer, peach, cola, vanilla, almond, coffee and the like. Wine coolers which are prepared by utilizing the instantly produced wine base exhibit a prolonged shelf life in comparison to non-treated control wine bases.

A typical wine cooler product which is prepared in accordance with the invention of the instant invention comprises:

(a) a wine base which has been treated in accordance with the aforementioned decharacterization, optionally followed by deacidification, fortification and neutralization processes which contains an alcohol content ranging from 18 to 24% by volume, having a total acid content of less than 0.50 gm/100ml, (The acid content may be substantially lower if decidification took place).

(b) flavoring amounts of one or more natural and/or artificial flavorings, and (c) water in an amount necessary to adjust the alcohol content of the final product to 3 to 6.5% by volume, and (d) carbon dioxide which should be present in an amount not to exceed 0.392 gm/100 ml.

The wine cooler products of the instant invention contain a total acid content ranging from 0.05 to 0.65 gm/100 ml and have a pH of 2.8 to 4.5.

Optional ingredients for incorporation into the wine cooler product include but are not limited to a sweetening amount of a sweetener selected from the group consisting of corn syrup and derivatives, invert sugar syrup and a liquid sugar of not less than 60° brix; coloring agents such as caramel color; acidulants such as citric acid and malic acid; one or more preservatives such as potassium metabisulfite, sodium metabisulfate, sulfur dioxide, the potassium salt of sorbic acid, benzoic acid, sodium benzoate and potassium benzoate.

The treated base wine produced by the above-identified process may also be utilized in the production of natural or artificially flavored cordial-type beverages which contain between 18.0 and 21.0% of alcohol by volume. The use of the decharacterized, optionally deacidified, fortified and neutralized base wine allows for the production of a cordial-type product of similar quality to those which one produced from distilled spirits bases.

A typical cordial-type product which is prepared in accordance with the invention of the instant invention comprises:
(a) a wine base which has been treated in accordance with the aforementioned decharacterization, optionally followed by deacidification, fortification and neutralization processes which contains an alcohol content ranging from 21 to 24% by volume, having a total acid content of less than 0.65 gm/100ml;
(b) flavoring amounts of one or more natural and/or articial flavors;
(c) dry sugar and/or a liquid sweetener selected from the group consisting of corn syrup and derivatives, invert sugar syrup and a liquid sugar of not less than 60° Brix.

The cordial type beverages of the instant invention contain a total acid content ranging from 0.05 to 0.65 gm/100 ml and have pH of 2.8 to 4.5.

Optional ingredients for incorporation into the cordial-type beverage product include by one not limited to coloring agents such as caramel color; acidulants such as citric or malic acid; one or more preservatives such as potassium matabisulfite, sodium matabisulfite, sulfur dioxide and/or the potassium salt of sorbic acid.

The following preparations and examples describe the manner and the process of make and using the invention but are not to be considered as limiting.

PREPARATION NO. 1

A white base wine of 11.0% alcohol by volume and 0.52 g total acidity per 100 milliliters was processed as follows. The wine was treated with "Duolite S-761" adsorbent to reduce its vinous character. The wine was then deacidified by treatment with "Duolite A-7" anion exchange which reduced the total acidity of the wine to 0.02 grams per 100 ml. The wine base was then fortified to 23.64% alcohol by volume by the addition of neutral grape spirits and neutralized by a treatment with activated carbon and recovered.

EXAMPLE 1

The 23.64% alcohol decharacterized and deacidified base wine produced in preparation No. 1 was used to produce a chocate flavored wine cooler with the following composition:

| COMPONENT | % |
| --- | --- |
| Decharacterized Deacidified White Wine (23.64% alcohol by volume, 0.02 g total acidity/100 ml) | 17.00 |
| Carbonated Water | 73.70 |
| High Fructose Corn Syrup | 9.00 |
| Natural and Artificial Chocolate Flavors | 0.30 |

This wine cooler was found to have a desirable chocolate flavor which was compatible with the wines character and acidity.

PREPARATION NO. 2

A white base wine of 11.0% alcohol by volume and 0.52 g total acidity per 100 milliliters was processed as follows. The wine was treated with "Duolite S-761" resin to reduce its vinous character. The wine base was then fortified to 23.64% alcohol by volume by the addition of neutral grape spirits and neutralized by a treatment with activated carbon and recovered.

EXAMPLE 2

The 23.64% alcohol decharacterized base wine produced in preparation No. 2 was used to produce a peach flavored cordial-type beverage with the following composition:

| COMPONENT | % |
| --- | --- |
| Decharacterized White Wine (23.64% alcohol by volume) 0.44 total acidity/100 ml | 81.0 |
| High Fructose Corn Syrup | 16.0 |
| Natural end Artificial Flavors | 3.0 |

The cordial type beverage was found to have a desirable peach flavor and was similar in other characteristics to cordials produced from distilled spirits bases.

We claim:
1. A process for treating wine which comprises:
(a) decharacterizing the wine by subjecting the wine to the effects of a non-ionic absorbent selected from the group consisting of phenolic resins and polyaromatic resins;
(b) fortifying the decharacterized wine to contain between 18 and 24 percent of alcohol by volume; and
(c) neutralizing the fortified wine by subjecting the fortified wine to the effects of activated carbon.
2. The process as defined in claim 1 wherein the wine is deacidified by contacting the wine with a weak base anionic ion exchange resins subsequent to decharacterizing the wine.
3. The process as defined in claim 2 wherein the anionic ion exchange resin is a weak base anion exchange resin having a high porosity phenolic, styrene divinyl benzene or acrylic divinyl benzene matrix with amine active sites.
4. A wine product produced according to the process as defined in claim 1.

* * * * *